United States Patent
Yip et al.

(10) Patent No.: US 8,043,554 B2
(45) Date of Patent: Oct. 25, 2011

(54) MANUFACTURING PROCESS USING BLADDERLESS MOLD LINE CONFORMAL HAT STRINGER

(75) Inventors: Thomas A. Yip, Seal Beach, CA (US); Steve P. Decoux, Fullerton, CA (US)

(73) Assignee: The Boeing Company, Chicago, IL (US)

( * ) Notice: Subject to any disclaimer, the term of this patent is extended or adjusted under 35 U.S.C. 154(b) by 1081 days.

(21) Appl. No.: 11/760,489

(22) Filed: Jun. 8, 2007

(65) Prior Publication Data

US 2008/0302915 A1    Dec. 11, 2008

(51) Int. Cl.
*B64C 1/06* (2006.01)
*B64C 1/12* (2006.01)
*B64C 3/18* (2006.01)

(52) U.S. Cl. ........ 264/573; 264/258; 264/545; 264/546; 244/132; 156/156

(58) Field of Classification Search .............. 264/258, 264/545, 546, 573; 244/133, 132, 123.7, 244/123.9; 156/156
See application file for complete search history.

(56) References Cited

U.S. PATENT DOCUMENTS

| | | | |
|---|---|---|---|
| 3,995,081 A | 11/1976 | Fant et al. | |
| 5,484,277 A * | 1/1996 | Lindsay | 425/388 |
| 6,190,484 B1 | 2/2001 | Appa | |
| 6,613,258 B1 * | 9/2003 | Maison et al. | 264/102 |
| 7,134,629 B2 | 11/2006 | Johnson et al. | |
| 7,293,737 B2 | 11/2007 | Engwall et al. | |
| 2003/0034588 A1 * | 2/2003 | Miura et al. | 264/258 |
| 2006/0208135 A1 | 9/2006 | Liguore et al. | |
| 2006/0290028 A1 * | 12/2006 | Pleite et al. | 264/258 |
| 2007/0176327 A1 * | 8/2007 | Petersson et al. | 264/319 |
| 2008/0029644 A1 | 2/2008 | Martinez Cerezo et al. | |
| 2008/0290214 A1 | 11/2008 | Guzman et al. | |
| 2008/0302915 A1 | 12/2008 | Yip et al. | |

FOREIGN PATENT DOCUMENTS

| | | | |
|---|---|---|---|
| FR | 2766407 | | 1/1999 |
| GB | 2110736 | | 6/1983 |
| JP | 60-139433 | * | 7/1985 |
| WO | WO2008064168 A2 | | 5/2008 |

OTHER PUBLICATIONS

PCT Intl Search Report and Written Opinion for Application No. PCT/US2008/064423, dated May 21, 2008, 14 pgs.

* cited by examiner

*Primary Examiner* — Richard Crispino
*Assistant Examiner* — Robert Dye
(74) *Attorney, Agent, or Firm* — Caven & Aghevli LLC

(57) ABSTRACT

Techniques for manufacturing structures that include composite hat stringers are disclosed. In one embodiment, a method of forming a composite structure includes placing a generally cured composite hat stringer on a tool, the hat stringer having a rigid mold line conformal surface for adjoining a generally uncured skin, positioning the skin adjacent to the rigid mold line conformal surface, coupling the skin to the rigid mold line conformal surface of the composite hat stringer, including applying a pressure to a surface of the skin to urge the skin into engagement with the composite hat stringer, and curing the skin.

18 Claims, 8 Drawing Sheets

MANUFACTURING PROCESS USING BLADDERLESS MOLD LINE CONFORMAL HAT STRINGER

CROSS REFERENCE TO RELATED APPLICATION

This patent application is related to co-pending, commonly-owned U.S. patent application Ser. No. 11/760,449 entitled "Bladderless Mold Line Conformal Hat Stringer", filed concurrently herewith on Jun. 8, 2007, which application is hereby incorporated by reference.

TECHNICAL FIELD

Embodiments relate generally to composite structural components, and more particularly, to manufacturing processes for composite hat stringer structures.

BACKGROUND

Structural members are available in a wide variety of configurations to provide structural support under a variety of loading conditions. In particular, the fuselage, wings, and empennage of an aircraft typically include structural members called stringers or longerons that are coupled to skin members on the fuselage, wing, and empennage surfaces that cooperatively provide flexural and torsional stiffness to these portions of an aircraft. Traditionally, the fuselage, wing, stabilizers, and empennage surfaces are fabricated from a metal, such as without limitation, aluminum, steel or titanium. The stringer may include a planar wall portion that is generally oriented in a direction approximately perpendicular to the skin member and extending in a generally length wise direction along the fuselage and empennage surface and generally spanwise direction along the wing or stabilizer so that the web portion offers resistance to bending. A flange portion may be positioned on one or both of the longitudinal edges of the web portion in order to provide increased rigidity and support to the stringer. The flange portion further allows the stringer to be coupled to the skin member by providing an attachment surface.

Fiber-reinforced composite materials are also available that may be used to form various structural members, and may be used as a substitute for metals, particularly in applications where relatively low weight and high mechanical strength is desired. As a result, fiber-reinforced composite materials are widely used in a variety of commercial and military aircraft, terrestrial vehicles and consumer products. The material is generally comprised of a network of reinforcing fibers that are generally applied in layers (e.g., plies), and a polymeric resin that substantially wets the reinforcing fibers to form an intimate contact between the resin and the reinforcing fibers. The material may be formed into a structural component by a variety of known forming methods, such as an extrusion process or other forming processes. The use of fiber-reinforced composite materials may have drawbacks including increased complexity in the manufacture and assembly of such materials, additional expense, and creation of waste when materials are improperly cured.

Although desirable results have been achieved using prior art apparatus and methods, a stringer and skin structure that may be fabricated at a low cost and result in a more integrated structure would have utility.

SUMMARY

Techniques for manufacturing structures that include composite hat stringers are disclosed. In one embodiment, a method for creating a reinforced composite structure includes coupling a skin to a rigid mold line conformal surface of a closed hat stringer, including applying pressure on the skin opposite the closed hat stringer to compress the skin against the closed hat stringer, the closed hat stringer providing a rigid surface to counteract the applied pressure, and curing the skin to the rigid mold line conformal surface.

In another embodiment, a method of forming a composite structure includes placing a generally cured composite hat stringer on a tool, the hat stringer having a rigid mold line conformal surface for adjoining a generally uncured skin, positioning the skin adjacent to the rigid mold line conformal surface, coupling the skin to the rigid mold line conformal surface of the composite hat stringer, including applying a pressure to a surface of the skin to urge the skin into engagement with the composite hat stringer, and curing the skin.

The features, functions, and advantages can be achieved independently in various embodiments of the disclosure or may be combined in yet other embodiments.

BRIEF DESCRIPTION OF THE DRAWINGS

Embodiments in accordance with the present disclosure are described in detail below with reference to the following drawings.

DETAILED DESCRIPTION

Apparatus and techniques for manufacturing structures that include a composite hat stringer are described herein. Many specific details of certain embodiments of the disclosure are set forth in the following description and in FIGS. 1 through 8 to provide a thorough understanding of such embodiments. One skilled in the art, however, will understand that the present disclosure may have additional embodiments, or that the present disclosure may be practiced without several of the details described in the following description. In the present discussion, it is understood that the term "fiber reinforced composite material" or "reinforced composite material" includes various non-homogeneous polymer-based and non-polymeric based materials, commonly referred to as "reinforced composites", "carbon-fiber composites", or still other terms known in the art.

Figure 1A:
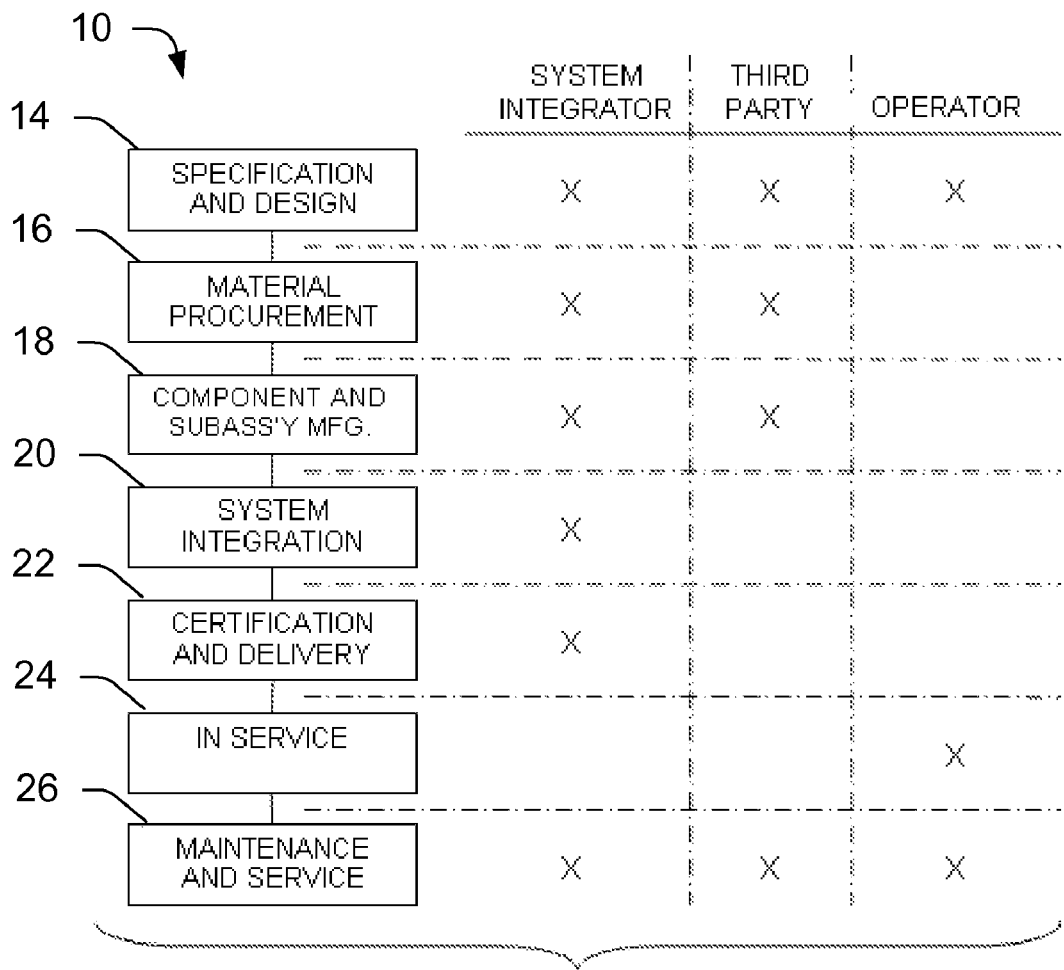
FIG. 1a is a flow diagram of aircraft production and service method.
Figure 1B:
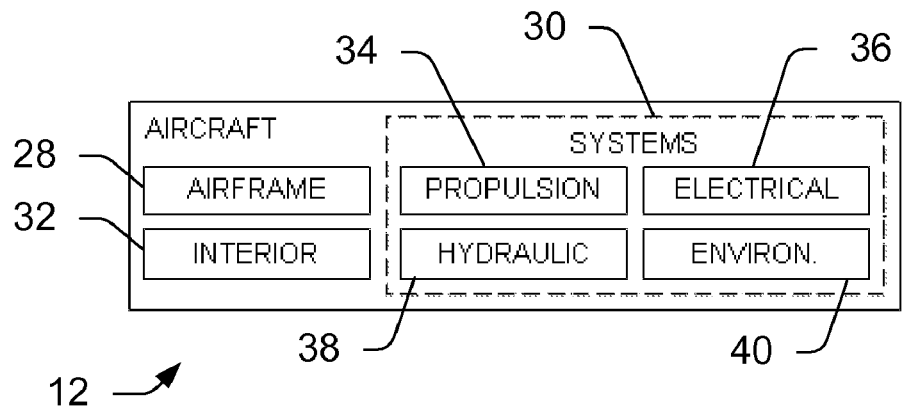
FIG. 1b is a block diagram of an aircraft.

Referring more particularly to the drawings, embodiments of the disclosure may be described in the context of an aircraft manufacturing and service method 10 as shown in FIG. 1a and an aircraft 12 as shown in FIG. 1b. During pre-production, exemplary method 10 may include specification and design 14 of the aircraft 12 and material procurement 16. During production, component and subassembly manufacturing 18 and system integration 20 of the aircraft 12 takes place. Thereafter, the aircraft 12 may go through certification and delivery 22 in order to be placed in service 24. While in service by a customer, the aircraft 12 is scheduled for routine maintenance and service 26 (which may include modification, reconfiguration, refurbishment, and so on).

Each of the processes of method 10 may be performed or carried out by a system integrator, a third party, and/or an operator (e.g., a customer), as indicated by the "X" in the grid to the right of the flow diagram of FIG. 1a. For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 1b, the aircraft 12 produced by exemplary method 10 may include an airframe 28 with a plurality of systems 30 and an interior 32. Examples of high-level systems 30 include one or more of a propulsion system 34, an electrical system 36, a hydraulic system 38, and an environmental system 40.

Apparatus and methods embodied herein may be employed during any one or more of the stages of the production and service method 10. For example, components or subassemblies corresponding to production process 18 may be fabricated or manufactured in a manner similar to components or subassemblies produced while the aircraft 12 is in service. Also, one or more apparatus embodiments, method embodiments, or a combination thereof may be utilized during the production stages 18 and 20, for example, by substantially expediting assembly of or reducing the cost of an aircraft 12. Similarly, one or more of apparatus embodiments, method embodiments, or a combination thereof may be utilized while the aircraft 12 is in service, for example and without limitation, to maintenance and service 26.

Figure 2:
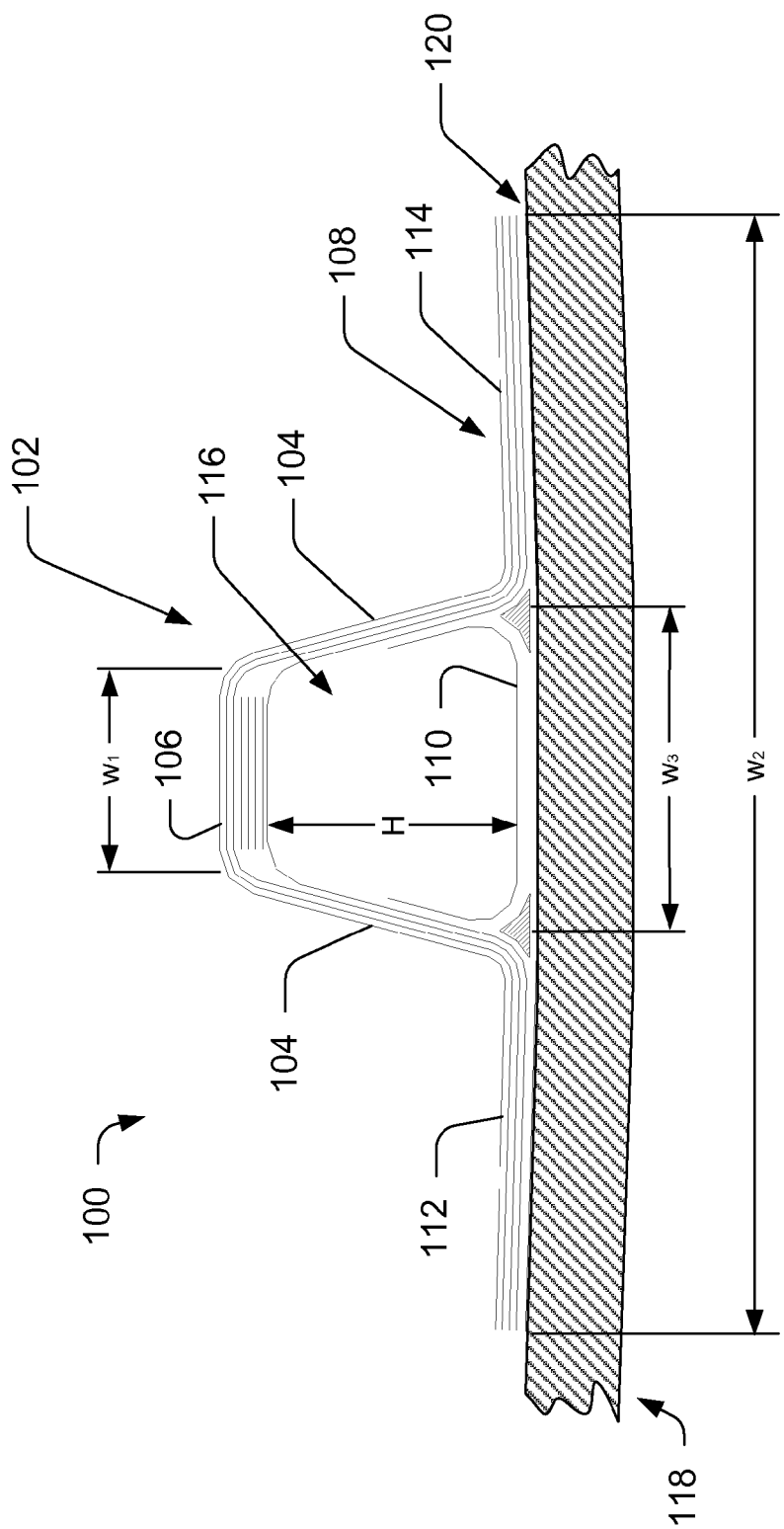
FIG. 2 is a partial cross sectional view of a hat stringer and skin assembly according to an embodiment of the disclosure.

FIG. 2 is a partial cross sectional view of a hat stringer and skin assembly 100 according to an embodiment of the disclosure. The hat stringer and skin assembly 100 includes an elongated hat stringer 102 having cavity wall portions 104 that are positioned between a first flange portion 106 and an opposing second flange portion 108. The second flange portion 108 further includes an inner liner 110 that extends between a first leg 112 and a second leg 114 to create a continuous generally planar surface.

A cavity 116 is defined by generally opposing cavity wall portions 104 situated between the first flange portion 106 and the inner liner 110. The cavity 116 may have a predetermined height H in order to provide a desired resistance to an applied load. The first flange portion 106, the second flange portion 108, and the inner liner 110 are generally planar members having predetermined widths $W_1$, $W_2$, and $W_3$, respectively. A conventional hat stringer typically includes angled cavity wall portions 104, such that the width $W_1$ of the first flange portion 106 is less than the width $W_3$ of the inner liner 110.

The cavity wall portion 104, the first flange portion 106, and the second flange portion 108 may be of a constant shape (e.g., thickness, shape, curvature, etc.) along a span of the hat stringer 102 (i.e., into the page), or they may vary continuously, or non-continuously along the span of the hat stringer 102. For example, a stringer situated in a wing generally perpendicular to the fuselage may converge in shape as the stringer extends laterally away from the fuselage. Therefore, the hat stringer 102 may be thicker and have relatively larger values for widths $W_1$, $W_2$, and $W_3$ at the end adjacent to the fuselage, while the end opposite the fuselage may be thinner and have relatively smaller values for widths $W_1$, $W_2$, and $W_3$.

The cavity wall portion 104, the first flange portion 106, and the second flange portion 108 may be generally formed from a reinforced composite material having multiple layers (or plies) of reinforcing fibers oriented in a predetermined orientation. For example, the hat stringer 102 may be formed substantially from prepreg, a fabric preimpregnated with a resin (polymeric or non-polymeric resin). Prepreg may be a combination of mat, fabric, nonwoven material or roving, impregnated or saturated with resin, and typically ready for molding. Standard prepreg may contain more resin than necessary for the finished part, therefore excess resin may be bled off from a curing part during a curing process. The arrangement of fibers in layers is generally known to one skilled in the art and thus will not be described in detail. Some portions of the hat stringer 102 may include more layers than other portions of the hat stringer, thus creating different thicknesses in the hat stringer. In some embodiments, for example, the first flange portion 106 may be thicker (i.e., contain more layers of reinforced composite material) than the inner liner 110. For example and without limitation, the first flange portion 106, the inner liner 110, the first leg 112, and the second leg 114 may be thicker if used in a wing when adjacent to the fuselage and then taper to fewer layers at the end opposite the fuselage.

The hat stringer and skin assembly 100 also includes a skin member 118 that is coupled to the second flange portion 108 using, for example, a suitable adhesive 120 and/or suitable fasteners (not shown). The skin member 118 may also be generally formed from a reinforced composite material having multiple layers of reinforcing fibers oriented in a predetermined orientation. In some embodiments, the skin 118 and the second flange portion 108 may include a curvature across their surfaces, such as when the assembly 100 is used in an aircraft including structures with complex geometries. The assembly of the skin member 118 and the hat stringer 102 will be described in greater detail below.

Figure 3:
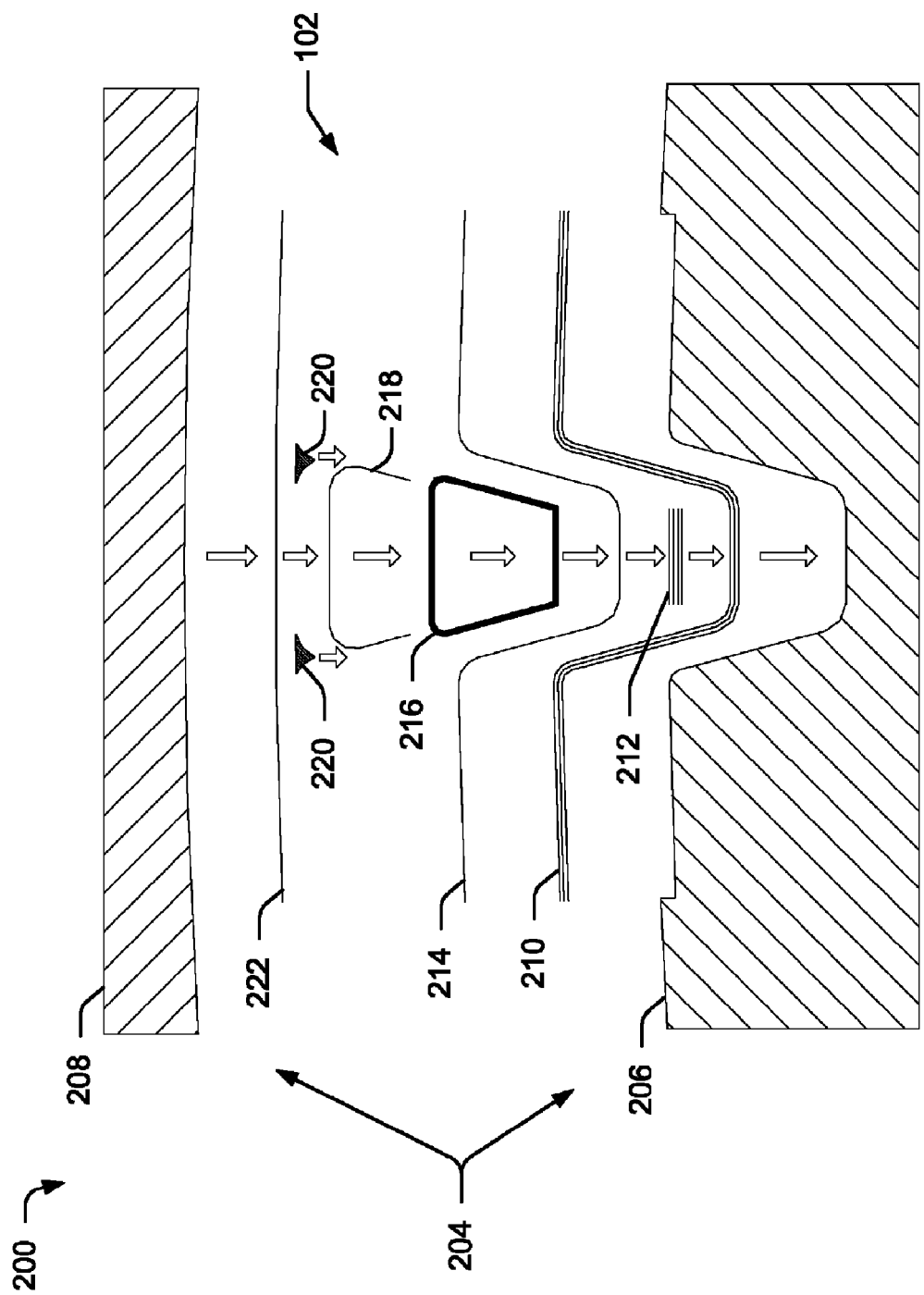
FIG. 3 is an exploded, partial cross sectional view of a hat stringer and mold tool according to an embodiment of the disclosure.

FIG. 3 is an exploded, partial cross sectional view of a hat stringer and mold tool according to an embodiment of the disclosure. The hat stringer 102 may be assembled in a process 200 by placing portions of reinforced composite material into a mold tool 204. The mold tool 204 includes a mold tool base 206 and a mold tool cover 208. The mold tool 204 may be fabricated from without limitation a metal, such as aluminum or steel, or other materials able to cure reinforced composite materials.

The mold tool base 206 includes a profile complementary to the hat stringer 102 as described above in FIG. 2. The hat stringer 102 may be assembled by placing prepreg layers into the mold tool base 206 to form an exterior hat portion 210. The exterior hat portion 210 may be formed by including any number of layers into the mold tool base 206. The layers forming the exterior hat portion 210 portion may be continuous across the profile of the hat stringer 102, or smaller layers of material may be placed into the mold tool base 206 to create a continuous exterior hat portion 210.

The thickness of the first flange portion 106 may be increased by adding additional layers of material 212 into the mold tool base 206. Generally, the number of layers is dependent on design requirements (e.g., strength, weight, tolerances, etc.) of the hat stringer 102. To secure the addition layers of material 212, one or more layers of material may be added to the hat stringer 102 to form an internal hat portion 214 in the mold tool base 206.

A bladder 216 may be inserted into the hat stringer 102. The bladder 216 may be an inflatable bladder used during a curing process to apply compressive pressure to the portions of the hat stringer 102 that circumscribe the cavity 116. For example, during a curing process, pressure and heat may be applied to the hat stringer 102 inside the mold tool 204. The bladder 216 may be inflated to create compressive forces in conjunction with the mold tool 204 to compress each of the cavity wall portions 104, the first flange portion 106, and the inner liner 110 during the curing process. After curing the hat stringer 102, the bladder may be removed.

The inner liner 110 may be formed by adding layers of material over the bladder 216. In some embodiments, the inner liner 110 may be formed by adding one or more layers to form a U-shape portion 218. The U-shape portion 218 may be supplemented by fillers 220 to create a continuous contour along the exterior side of the second flange portion 108. The fillers 220 may be formed from similar material as the prior described layers, such as prepreg, or the fillers 220 may be formed of solid materials such as plastic, wood, composite, metal, or any other solid material.

The second flange includes a second flange external portion 222. As previously described, the second flange external portion 222 (and any other portion of the hat stringer 102) may be formed with one or more layers of material using either continuous layers of material or smaller layers of material that form a continuous layer in union. The hat stringer 102 provides a rigid mold line conformal surface along the flange exterior portion 222 after the hat stringer has been cured. The mold tool cover 208 may be placed over the second flange external portion 222 and adjacent to the mold tool base 206, thereby containing the hat stringer 102 within the mold tool 204 in preparation for a curing process.

Figure 4:
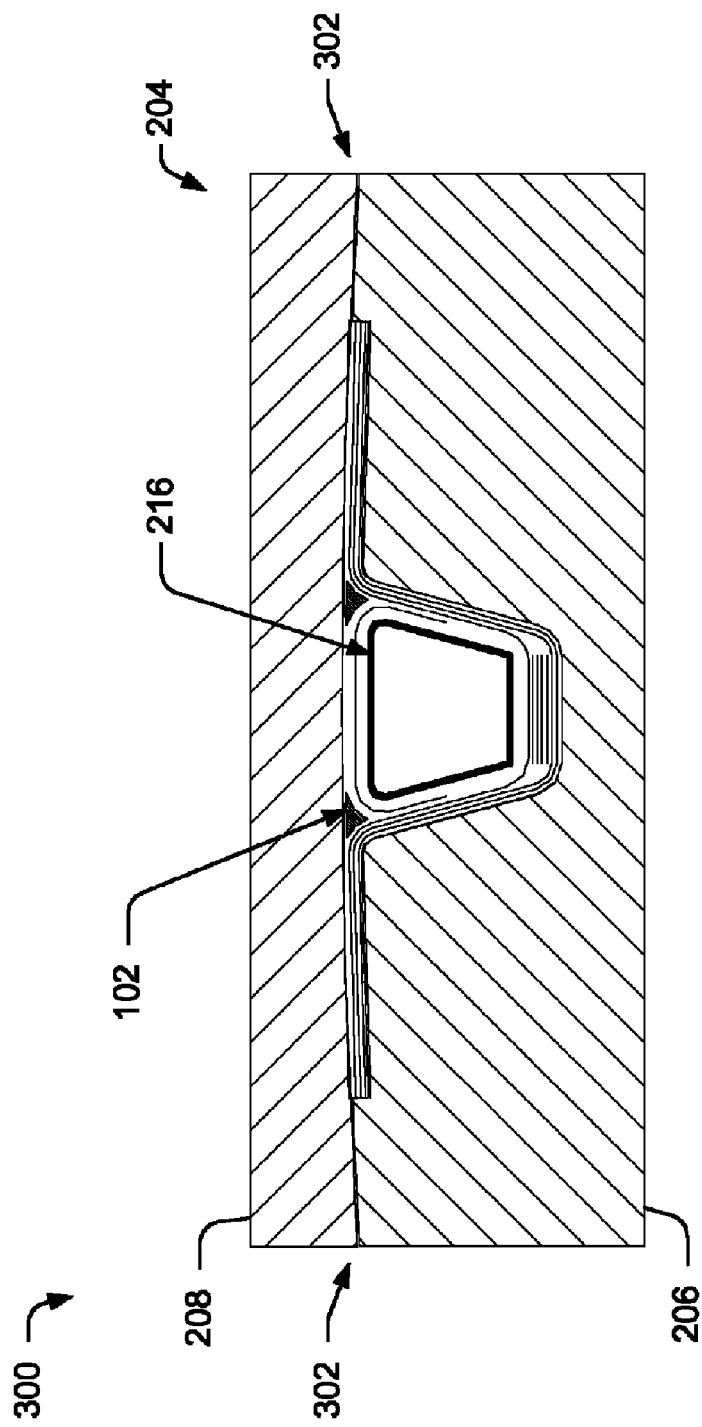
FIG. 4 is a partial cross sectional view of a hat stringer and a mold tool according to an embodiment of the disclosure.

FIG. 4 is a partial cross sectional view of a hat stringer and a mold tool according to an embodiment of the disclosure. As illustrated in FIG. 4, the mold tool 204 is configured for a curing process 300. The mold tool cover 208 may be placed adjacent to the mold tool base 206, such as by bolts, clamps, or fasteners (not shown) or it may be secured by other means such as by an external press (not shown).

The mold tool 204 contains the hat stringer 102 when assembled and may facilitate the addition of pressure and/or heat during the curing process 300. The hat stringer 102 may be placed under a vacuum bag configured for applying pressure during the curing process 300, thus creating compressive forces against all portions of the hat stringer, including the legs 112, 114 of second flange portion 108.

The mold tool 204 may include one or more gaps 302 to permit the bleeding of excess resin away from the hat stringer 102. For example, when standard prepreg is used to form the hat stringer 102, the prepreg may include extra resin that is bled off from the hat stringer during the curing process 300 and may exit the mold tool 204 through the gaps 302. In addition, the mold tool may include one or more inlets and/or outlets (not shown) to provide fluid or gas to the bladder 216 to expand and/or contract the bladder.

Figure 5:
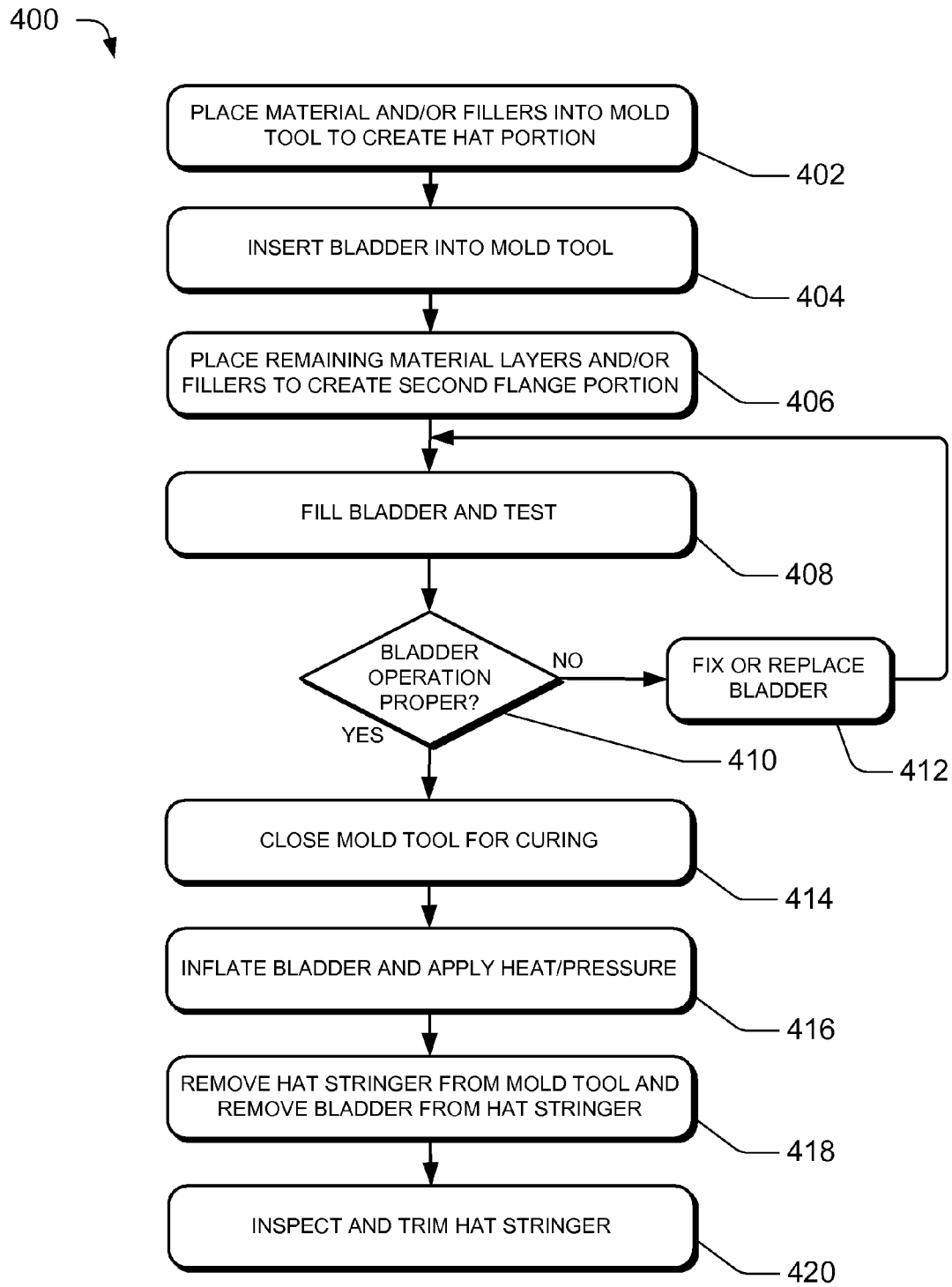
FIG. 5 is a flowchart that shows a process of making a hat stringer according to still yet another embodiment of the disclosure.

FIG. 5 is a flowchart that shows a process 400 of making a hat stringer according to still yet another embodiment of the disclosure. At block 402, material and/or fillers are placed into the mold tool to create the hat portion. For example, the exterior hat portion 210, the additional layers of material 212, and the internal hat portion 214 may be inserted into the mold tool. At block 404, the bladder 216 is inserted into the mold tool. At block 406, the remaining material layers and/or fillers may be placed into the mold tool around the bladder to form the second flange portion 108 of the hat stringer 102. For example, the U-shape portion 218, the fillers 220, and the second flange external portion 222 may be inserted into the mold tool to complete the hat stringer 102.

At block 408, the bladder 216 may be filled with gas, and inspected for proper operation. In order to test the bladder 216, the mold tool 204 may be closed, the bladder inflated, and then the mold tool opened to inspect the bladder operation. In some instances, the bladder 216 may pinch or wrinkle the material layers of the hat stringer 102, or fail to inflate as required to effectively cure the hat stringer, thus requiring the bladder to be repositioned or replaced. At decision block 410, a determination is made whether the bladder is operating properly. If the bladder 216 is not operating properly, the bladder is fixed or replaced at block 412, and then the process 400 continues at the block 408. If the bladder 216 is operating properly at the decision block 410, the process 400 proceeds to block 414.

At the block 414, the mold tool 204 is closed for curing. Closing the mold tool 204 may include securing fasteners on or adjacent to the mold tool, inserted the mold tool into a press, or other actions necessary to prepare the mold tool and hat stringer 102 for curing. At block 416, the bladder 216 is inflated and heat and/or pressure is applied to the hat stringer 102 contained in the mold tool 204 to cure the hat stringer. In an exemplary curing process, a prepreg hat stringer is heated to approximately 350° F. for 60 minutes to 120 minutes to cure the pregreg. During the exemplary process, additional resin is extracted from the hat stringer 102 through the gaps 302. At block 418, the mold tool 204 is opened and the hat stringer 102 is removed, typically while the mold tool is still hot from the curing process. The bladder 216 is also removed from the hat stringer 102. At block 420, the hat stringer 102 is inspected and trimmed to shape.

Figure 6:
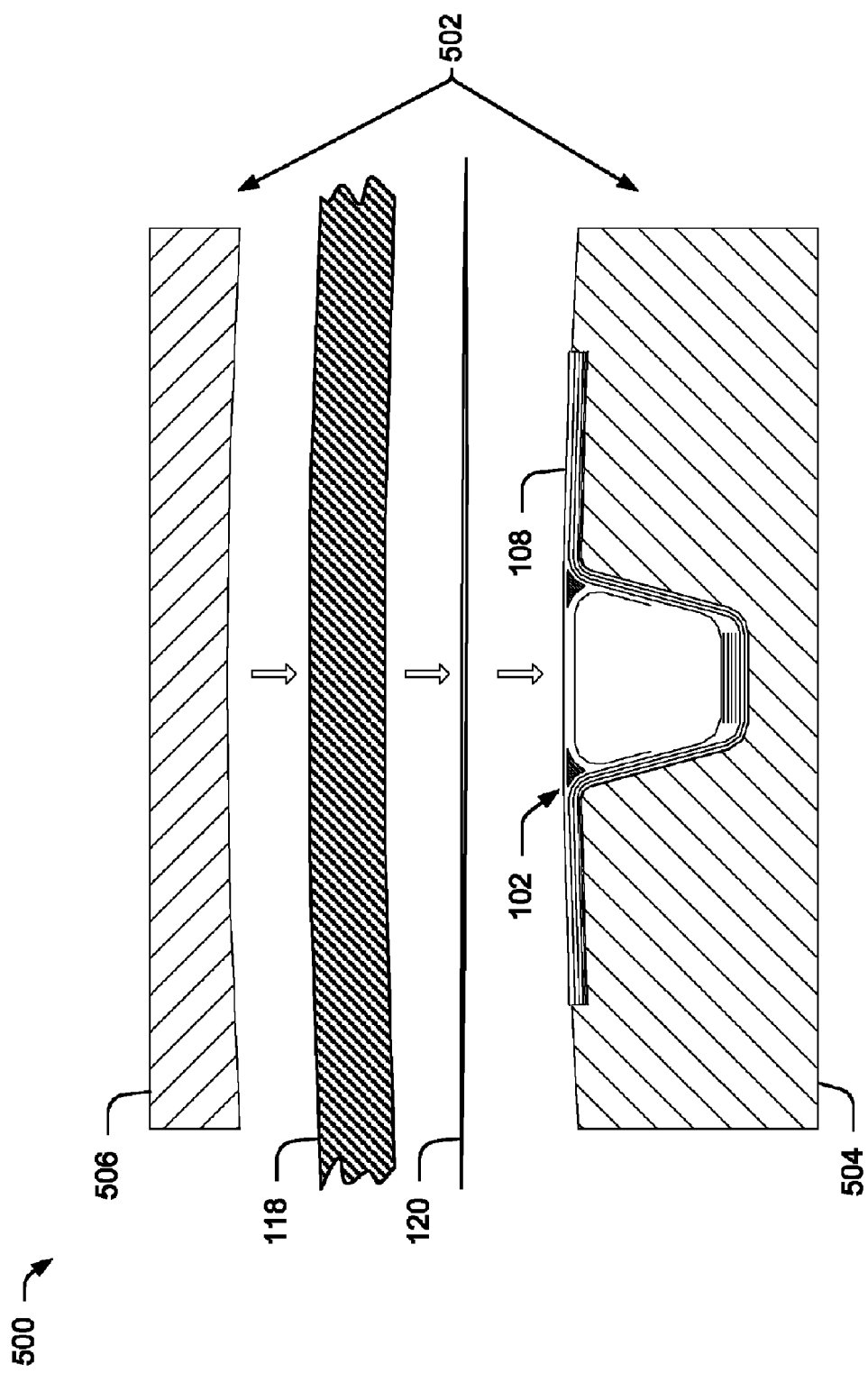
FIG. 6 is an exploded, partial cross sectional view of a hat stringer and skin assembly and a mold tool according to an embodiment of the disclosure.

FIG. 6 is an exploded, partial cross sectional view of a hat stringer and skin assembly and an assembly mold tool 502 according to an embodiment of the disclosure. The assembly 500 includes the hat stringer 102 and the skin 118 as described with reference to FIG. 2. The hat stringer 102 may be in a relatively cured state, such as the cured state resulting from the process 400 shown in FIG. 5. The skin 118 may be in a relatively uncured state. The skin 118 may be formed of the same, or similar, material layers that are used to form the hat stringer 102, and thus require a similar curing process as described in FIG. 5. In other embodiments, the skin 118 may be another material, or portions of material, that may be formed to the contour of the relatively cured hat stringer 102 (i.e., the contour of the second flange portion 108).

The hat stringer 102 is placed into an assembly mold tool base 504. The assembly mold tool base 504 may be substantially similar to the mold tool base 206 and used for curing the hat stringer 102. In other embodiments, the assembly mold tool base 504 may include additional features for forming the assembly 500. For example, the mold tool base 504 may include recesses for additional hat stringers 102, such as when it is desirable to form the assembly 500 with more than one hat stringer in connection to the skin 118. In addition, the assembly mold tool base 504 may include a unique contour along the longitudinal axis of the hat stringer 102, such as one containing contours necessary for the wing of an aircraft. Therefore, a generally planar hat stringer 102 may be inserted into the contoured assembly mold tool base to create a contoured assembly.

The exterior portion of the second flange portion 108 may be covered with adhesive 120, such as a film adhesive. One suitable film adhesive is the FM-300 film adhesive, available from Cytec Industries, Incorporated of West Paterson, N.J. although other suitable alternatives exist. In some embodiments, the skin member 118 may be coupled to the second flange portion 108 by interposing the adhesive 120 between a relatively uncured skin member 118 and the second flange portion 108 of a relatively cured hat stringer 102. In some instances, end caps (not shown) may be inserted in the open ends of the hat stringer 102 to facilitate pressurizing the internal cavity of the hat stringer during a curing process. An assembly mold tool cover 506 may then be positioned adjacent to the skin 118. The film adhesive may then be cured while the uncured skin member 118 is cured, thus forming a secure adhesive bond between the second flange portion 108 and the skin member 118.

Figure 7:
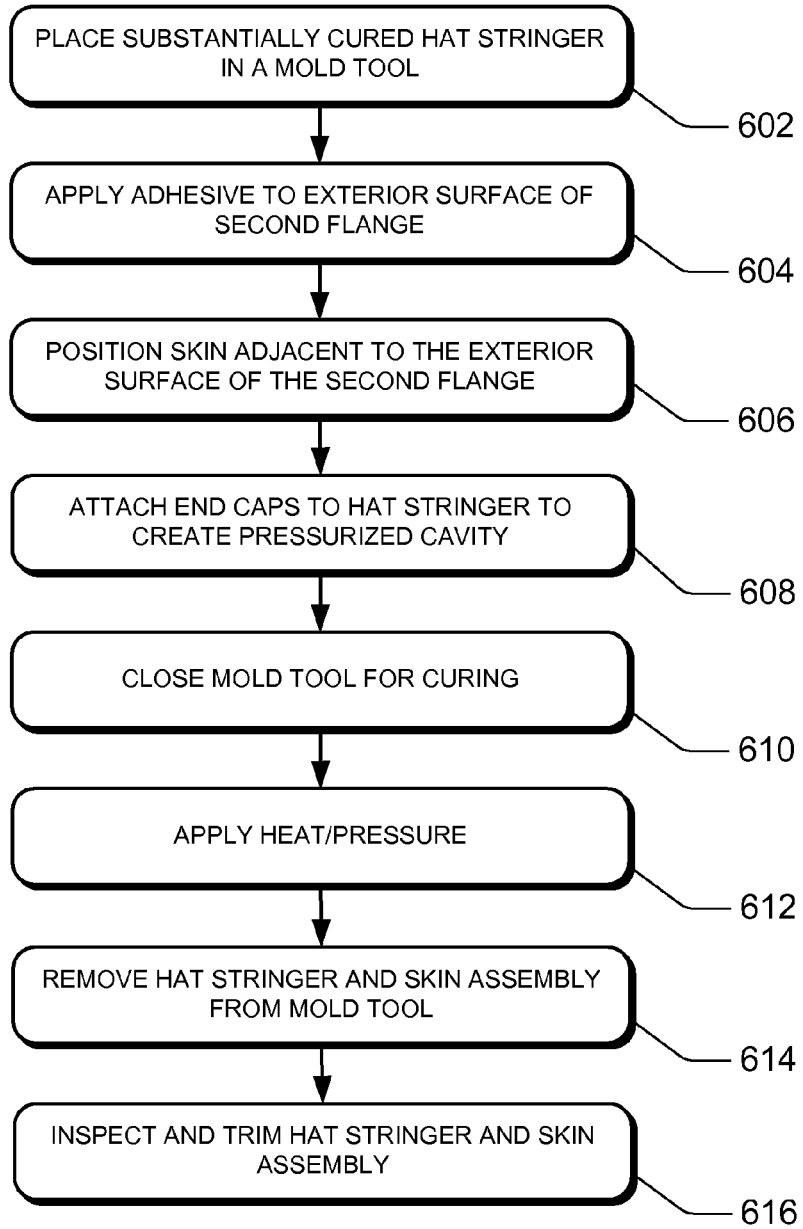
FIG. 7 is a flowchart that shows a process of making a hat stringer and skin assembly according to still yet another embodiment of the disclosure.

FIG. 7 is a flowchart that shows a process 600 of making a hat stringer and skin assembly according to still yet another embodiment of the disclosure. At block 602, the hat stringer 102 that is in a relatively cured state is placed in the assembly mold tool 502. At block 604, the adhesive 120 is applied to the exterior surface of the second flange portion 108 of the hat stringer 102. At block 606, the skin 118 is positioned adjacent to the exterior surface of the second flange portion 108. At block 608, end caps are attached to the hat stringer to seal the cavity 116. The cavity 116 may be ported to an autoclave to pressurize (or equalize with the pressure from the autoclave). Pressurizing the cavity may retain the shape of the hat stringer 102 and assist in resisting pressure loads against the skin 120 during the process 600. At block 610, the assembly mold tool cover 506 is positioned adjacent to the skin 118, thus containing the skin and hat stringer 102 within the assembly mold tool 502 for the curing process. At block 612, heat and/or pressure are applied to the assembly to cure the skin 118 and bond the skin 118 to the hat stringer 102. At block 614, the hat stringer and skin assembly 100 is removed from the assembly mold tool 502. At block 616, the hat stringer and skin assembly 100 is inspected and trimmed.

Figure 8:
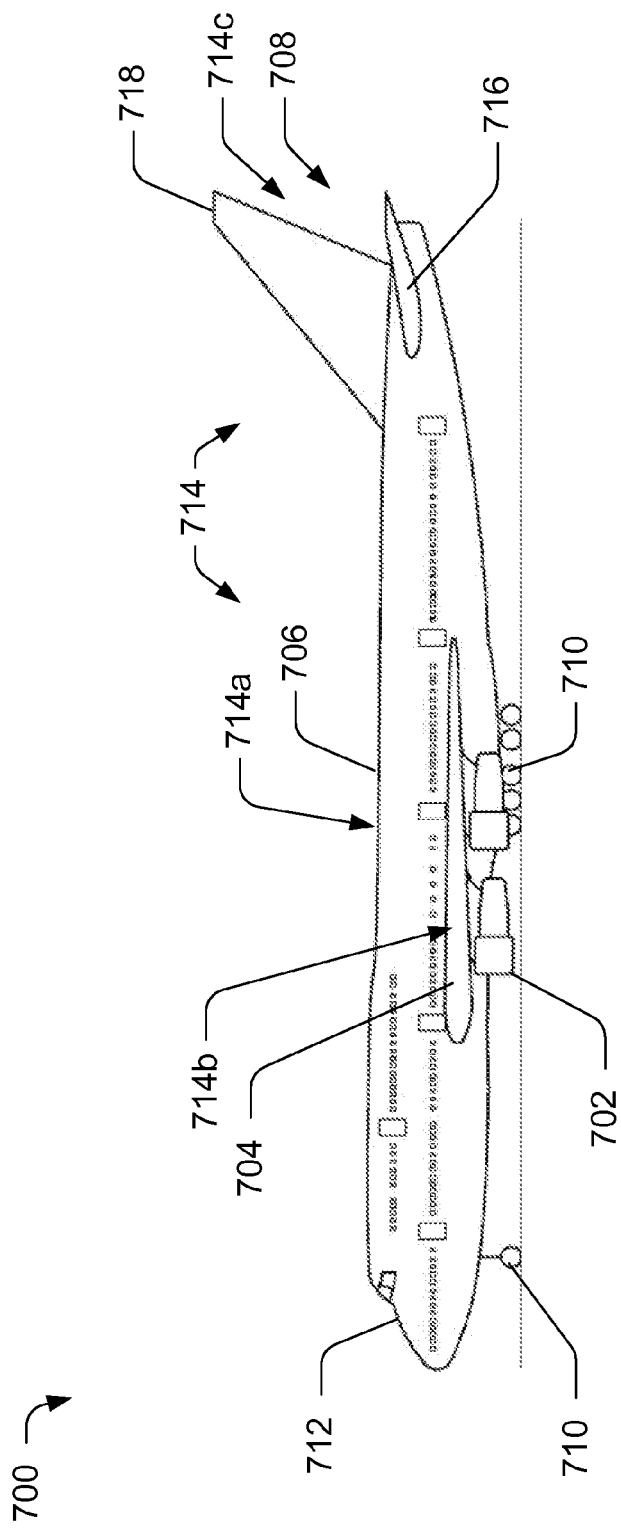
FIG. 8 is a side elevation view of an aircraft having one or more of the disclosed embodiments of the present disclosure.

Those skilled in the art will also readily recognize that the foregoing embodiments may be incorporated into a wide variety of different systems. Referring now in particular to FIG. 8, a side elevation view of an aircraft 700 having one or more of the disclosed embodiments of the present disclosure is shown. The aircraft 700 generally includes a variety of components and subsystems known in the pertinent art, which in the interest of brevity, will not be described in detail. For example, the aircraft 700 generally includes one or more propulsion units 702 that are coupled to wing assemblies 704, or alternately, to a fuselage 706 or even other portions of the aircraft 700. Additionally, the aircraft 700 also includes an empennage 708 horizontal stabilizer 716 and vertical stabilizer 718 and a landing assembly 710 coupled to the fuselage 706, and a flight control system 712 (not shown in FIG. 8), as well as a plurality of other electrical, mechanical and electromechanical systems that cooperatively perform a variety of tasks necessary for the operation of the aircraft 700.

With reference still to FIG. 8, the aircraft 700 may include one or more of the embodiments of the hat stringer 714 according to the present disclosure, which may be incorporated into various structural portions of the aircraft 700. For example, the various disclosed embodiments may be used to form structural portions in the fuselage 706 (714a), the wing assemblies 704 (714b) and/or structural portions in the empennage 708 (714c).

The aircraft 700 is generally representative of a commercial passenger aircraft, which may include, for example without limitation, the 737, 747, 757, 767, 777 and 787 commercial passenger aircraft available from The Boeing Company of Chicago, Ill. In alternate embodiments, the present disclosure may also be incorporated into flight vehicles of other types, or other moveable platforms. Examples of such flight vehicles include manned or unmanned military aircraft, rotary wing aircraft, or even ballistic flight vehicles, as illustrated more fully in various descriptive volumes, such as Jane's All The World's Aircraft, available from Jane's Information Group, Ltd. of Coulsdon, Surrey, UK. In addition, moveable vehicles may include maritime vessels, automobiles, and other moveable platforms for transit on land or in water.

While preferred and alternate embodiments of the disclosure have been illustrated and described, as noted above, many changes can be made without departing from the spirit and scope of the disclosure. Accordingly, the scope of the disclosure is not limited by the disclosure of these preferred and alternate embodiments. Instead, the disclosure should be determined entirely by reference to the claims that follow.

What is claimed is:

1. A method of creating a reinforced composite structure, comprising:
    coupling a skin to a rigid mold line conformal surface of a closed hat stringer, including applying pressure on the skin opposite the closed hat stringer to compress the skin against the closed hat stringer, the closed hat stringer providing a rigid surface to counteract the applied pressure; and
    curing the skin to the rigid mold line conformal surface by coupling end caps to the closed hat stringer to create a pressurized cavity and applying pressure within the cavity to maintain the shape of the closed hat stringer.

2. The method of claim 1, wherein coupling the skin to a rigid mold line conformal surface includes repetitively placing layers of fiber-reinforced composite material to form the skin.

3. The method of claim 2, wherein the fiber-reinforced composite material is prepreg.

4. The method of claim 1 further comprising:
    removing the reinforced composite structure from a tool;
    removing excess resin from the reinforced composite structure; and
    trimming excess material from the reinforced composite structure.

5. A method of forming a composite structure, comprising:
    placing a generally cured composite hat stringer on a tool, the composite hat stringer having a rigid mold line conformal surface for adjoining a generally uncured skin;
    positioning the skin adjacent to the rigid mold line conformal surface;
    creating a cavity capable of being pressurized within the composite hat stringer;
    coupling the skin to the rigid mold line conformal surface of the composite hat stringer by:
        urging the skin into engagement with the composite hat stringer, and
        applying pressure within the cavity to maintain the shape of the composite hat stringer; and
    curing the skin, wherein creating a cavity capable of being pressurized within the composite hat stringer includes coupling end caps to the composite hat stringer.

6. The method of claim 5, wherein applying a pressure to a surface of the skin includes the composite hat stringer providing a resisting force on the opposite surface of the skin to compress the skin for engagement with the composite hat stringer.

7. The method of claim 5 further comprising applying adhesive between the closed hat stringer and the skin.

8. The method of claim 7, wherein the adhesive cures the skin to the closed hat stringer simultaneous with the curing of the skin.

9. The method of claim 5, wherein positioning the generally uncured skin adjacent to the closed hat stringer includes contouring the skin to conform to the contour of the rigid mold line conformal surface.

10. The method of claim 5 further comprising:
removing the hat stringer and skin from the tool;
removing excess resin from at least one of the tool, hat stringer, and the skin; and
trimming the cured hat stringer and skin to shape.

11. The method of claim 5, wherein the skin is formed of a fiber-reinforced composite material.

12. The method of claim 5, wherein positioning a generally uncured skin adjacent to the closed hat stringer includes repetitively placing layers of fiber-reinforced composite material over the closed hat stringer to form the skin.

13. A method of stiffening an aircraft structure, comprising:
creating a generally cured composite closed hat stringer including:
placing a hat portion of uncured composite on a first tool to create a hat stringer;
inserting an elongated bladder over the hat portion;
placing a base portion of uncured composite across the bladder, the base portion connecting with the hat portion to enclose the bladder and create a continuous exterior surface opposite the hat portion;
curing the hat stringer; and
removing the bladder from the hat stringer;
placing a generally cured composite closed hat stringer on a second tool;
creating a generally uncured skin to adjoin to the closed hat stringer;
coupling end caps to the closed hat stringer to create a pressurized cavity;
adhesively joining the closed hat stringer and the skin; and
curing the skin by applying pressure within the cavity to maintain the shape of the closed hat stringer.

14. The method of claim 13, wherein creating a generally uncured skin includes repetitively placing layers of fiber-reinforced composite material over the closed hat stringer to form the skin.

15. The method of claim 13, wherein at least one of placing the hat portion and placing the base portion includes repetitively placing layers of fiber-reinforced composite material.

16. The method of claim 13, wherein curing the skin further adjoins the skin and the closed hat stringer.

17. The method of claim 13, wherein the generally uncured skin conforms to the contour of the generally cured hat stringer.

18. The method of claim 13 further comprising configuring the hat stringer and skin to at least one of a fuselage, wing assembly, or empennage of an aircraft.

* * * * *